Patented Dec. 13, 1927.

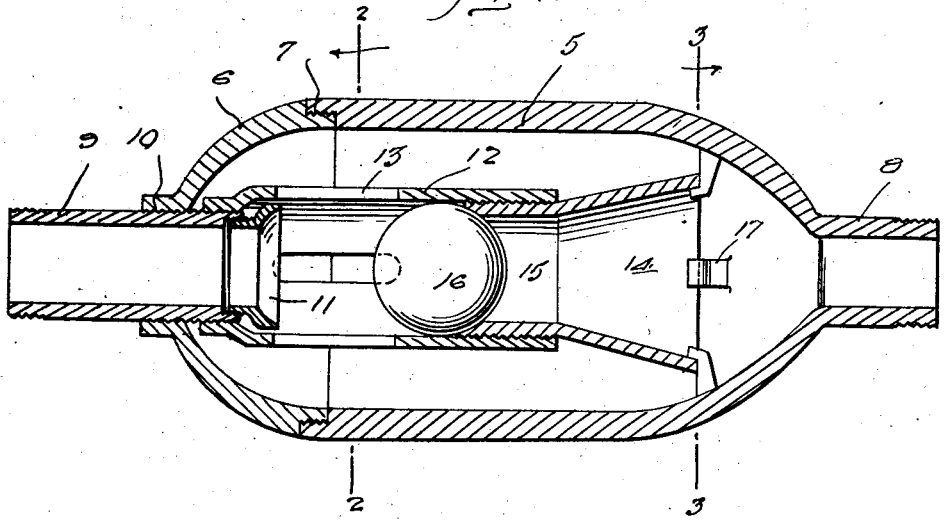
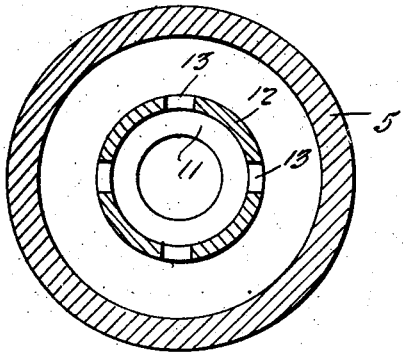 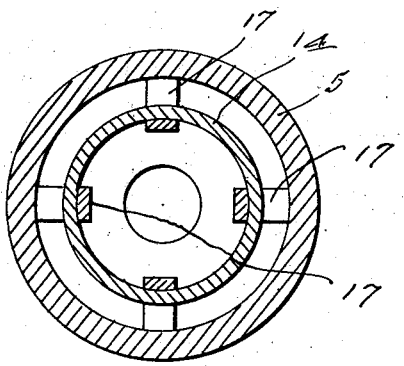

1,652,341

UNITED STATES PATENT OFFICE.

LESTER C. BECK AND JESSE LAMASCUS, OF MAYSVILLE, OKLAHOMA.

CHECK VALVE.

Application filed April 18, 1927. Serial No. 184,707.

The present invention relates to a check valve designed particularly for use in pipe lines connected with the pump used in deep oil wells and the like.

One of the important objects of the invention lies in the provision of a check valve which is sure in its operation, efficient and reliable, easy to assemble and disassemble, and otherwise well adapted to the purpose for which it is designed.

With the above and numerous other objects in view as will appear as the description proceeds, the invention resides in certain novel features of construction, and in the combination and arragement of parts as will be hereinafter more fully described and claimed.

In the drawing:

Figure 1 is a longitudinal section through the check valve embodying the features of our invention, Figures 2 and 3 are transverse sections therethrough taken substantially on the lines 2—2 and 3—3 of Figure 1.

Referring to the drawing in detail, it will be seen that the numeral 5 denotes the main casing section and the numeral 6 the auxiliary casing section which is threadedly engaged with the section 5 as at 7. An outlet nipple 8 is formed at the end of the section 5 for connection with the pipe line. A nipple 9 is extended and threaded through an opening 10 in the section 6 coaxial with the outlet nipple 8. A valve seat 11 is threaded in the interior end of the nipple 9. A skeleton pipe 12 having slots 13 is threaded over the inner end of the nipple 9. A funnel 14 has a cylindrical extension 15 threaded interiorly in the end of the skeleton pipe 12 and holds the ball valve 16 therein. The outer end of the funnel 14 is held in the casing section 5 by lugs 17 radiating inwardly therefrom to hold the larger end of the funnel in spaced relation to the interior of the section 5 and co-axially disposed in relation to the outlet nipple 8.

In assembling this check valve the nipple 9 is first threaded in the opening 10 and then the valve 11 is threaded in the inner end of the nipple 9. The skeleton pipe 12 is threaded over the outer portion of the inner end of the nipple 9 and the ball 16 is inserted therein and then the funnel 14 is engaged in the skeleton pipe 12 as described. The section 5 is threaded in engagement with section 6 and causes the lugs 17 to engage the larger end of the funnel 14.

The oil flows from left to right in Figure 1, entering the nipple 9 and unseating the valve ball 16 from the seat 11 so that the oil may flow freely through the slots 13 and through the casing section 5 out through the outlet nipple 8. When the pressure stroke of the pump is completed, the back pressure through the nipple 8 will enter the funnel 14 and force the valve 16 onto the seat 11. This funnel 14 is important in assuring quick and positive action of the check valve.

It is thought that the construction, operation, and advantages of this invention will now be quite apparent to those skilled in this art without a more detailed description thereof. The present embodiment of the invention has been disclosed in detail merely by way of example since in actual practice it attains the features and advantages enumerated as desirable in the statement of the invention and the above description. It will be apparent that changes in the details of construction, and in the combination and arrangement of parts may be resorted to without departing from the spirit and scope of the invention as hereinafter claimed or sacrificing any of its advantages.

Having thus described our invention, what we claim as new is:—

1. A check valve structure of the class described comprising a pair of detachable sections one of which has an opening, a nipple threaded in the opening, a valve seat threaded in the inner end of the nipple, a skeleton pipe having slots threaded over the inner end of the nipple, a funnel threaded in the skeleton pipe, a ball in the skeleton pipe for association with the seat, the other section being provided with an outlet nipple.

2. A check valve structure of the class described comprising a pair of detachable sections one of which has an opening, a nipple threaded in the opening, a valve seat threaded in the inner end of the nipple, a skeleton pipe having slots threaded over the inner end of the nipple, a funnel threaded in the skeleton pipe, a ball in the skeleton pipe for association with the seat, the other section being provided with an outlet nipple, lugs projecting inwardly from said other section for engaging the funnel to hold the same in spaced relation to the interior of said other section.

In testimony whereof we affix our signatures.

LESTER C. BECK.
JESSE LAMASCUS.